US012775146B2

(12) United States Patent
Neri et al.

(10) Patent No.: US 12,775,146 B2
(45) Date of Patent: Oct. 27, 2026

(54) TOWER-MOUNTABLE PLASTIC FIBER LOOP STORAGE BASKET FOR A TELECOMMUNICATIONS CLOSURE

(71) Applicant: CommScope Technologies LLC, Hickory, NC (US)

(72) Inventors: Genaro Neri, Juarez (MX); Oscar Daniel Valenzuela Lopez, Juarez (MX); Jesus Gustavo Pureco Chico, Juarez (MX)

(73) Assignee: CommScope Technologies LLC, Hickory, NC (US)

( * ) Notice: Subject to any disclaimer, the term of this patent is extended or adjusted under 35 U.S.C. 154(b) by 563 days.

(21) Appl. No.: 18/322,740

(22) Filed: May 24, 2023

(65) Prior Publication Data

US 2023/0384546 A1 Nov. 30, 2023

Related U.S. Application Data

(60) Provisional application No. 63/346,396, filed on May 27, 2022.

(51) Int. Cl.
*G02B 6/00* (2006.01)
*G02B 6/44* (2006.01)

(52) U.S. Cl.
CPC ......... *G02B 6/4446* (2013.01); *G02B 6/4452* (2013.01)

(58) Field of Classification Search
CPC .. G02B 6/4446; G02B 6/4452; G02B 6/4442; G02B 6/00
See application file for complete search history.

(56) References Cited

U.S. PATENT DOCUMENTS

| | | | | |
|---|---|---|---|---|
| 2009/0185782 | A1* | 7/2009 | Parikh ................ | G02B 6/44465 385/135 |
| 2012/0230645 | A1* | 9/2012 | Marmon ............ | G02B 6/44526 385/135 |
| 2018/0039037 | A1* | 2/2018 | Aznag .................. | G02B 6/4444 |
| 2021/0382258 | A1* | 12/2021 | Claessens .......... | G02B 6/44465 |
| 2025/0028134 | A1* | 1/2025 | Beymer ............... | G02B 6/4455 |

OTHER PUBLICATIONS

Commscope® FOSC 450 Gel-Sealed Fiber Optic Splice Closure, 2017 Product Ordering Guide, 3rd Edition (40 pages), admitted as prior art as of May 27, 2022.

Commscope® FOSC ACC D Basket and D Basket Tall Installation Instruction For use with FOSC 400 D Splice Closures, © 1999, 2000, 2008, 2009, 2016 CommScope, Inc., PML 374583 F269.05/09 (2 pages), admitted as prior art as of May 27, 2022.

(Continued)

*Primary Examiner* — Jennifer Doan
(74) *Attorney, Agent, or Firm* — Merchant & Gould P.C.

(57) ABSTRACT

A fiber loop storage basket for an optical fiber management assembly of a telecommunications closure. The fiber loop storage basket can be mounted to a tower of the assembly that also pivotally supports fiber management trays. The fiber loop storage basket can be constructed of plastic and includes mounting features for securely mounting the fiber loop storage basket to the tower. A metal fiber loop storage basket mounted to the tower can be replaced with a plastic basket according to the present disclosure mounted to the same mounting portion of the tower as the metal fiber loop storage basket.

22 Claims, 18 Drawing Sheets

(56) References Cited

OTHER PUBLICATIONS

COMMSCOPE® now meets next, https://www.commscope.com/product-type/cabinets-panels-enclosures/closures-terminals/accessories/item089279-000/, FOSC-ACC-D-BASKET/CommScope, retrieved from the Internet on May 17, 2022 (3 pages), admitted as prior art as of May 27, 2022.

Tyco Electronics, FOSC 450, Fiber Optic Splice Closure Ordering Guide, © 2004, Tyco Electronics Corporation, Printed in USA #1654571 F429 8/04 (26 pages), admitted as prior art as of May 27, 2022.

* cited by examiner

TOWER-MOUNTABLE PLASTIC FIBER LOOP STORAGE BASKET FOR A TELECOMMUNICATIONS CLOSURE

CROSS-REFERENCE TO RELATED APPLICATION

This application claims the benefit of U.S. Provisional Patent Application No. 63/346,396, filed May 27, 2022, which application is hereby incorporated by reference in its entirety.

TECHNICAL FIELD

The present disclosure relates to improvements in fiber loop storage baskets of optical fiber management assemblies of telecommunications closures.

BACKGROUND

Optical fibers of telecommunications networks are managed at telecommunications equipment located at different network distribution locations. Such telecommunications equipment can include closures, cabinets, shelves, panels and so forth. The equipment typically includes management assemblies to organize, store, route and connect optical fibers within the network. For example, optical fibers from provider side cables can be routed and optically connected to optical fibers of subscriber side cables using such assemblies. The assemblies can include features for supporting optical fiber splices, ferrules, connectors, adapters, splitters, wave division-multiplexers and so forth. In addition, the assemblies can include features for storing and protecting optical fibers. In addition, the assemblies can include features for fixing end portions of cable jackets so that optical fibers can emerge from the cable jackets and be organized on the other equipment. In addition, the assemblies can include features for securing and guiding protective tubes that hold lengths of optical fibers beyond where they have emerged from the cable jackets.

The assemblies can include fiber management trays, which can be used to, e.g., support splices and other fiber management components between incoming and outgoing optical fibers that are routed onto the trays. A typical fiber management assembly can include a support structure to which multiple fiber management trays are pivotally mounted in a stack. The pivoting permits access to a desired one of the stack of trays.

The assemblies can include baskets for storing loops of optical fibers on the assembly without necessarily routing them to a fiber management tray.

SUMMARY

In general terms, the present disclosure relates to improvements in optical fiber management assemblies.

In further general terms, the present disclosure relates to improvements in fiber optic closures and other fiber optic distribution equipment.

In further general terms, the present disclosure is directed to a fiber loop storage basket of an optical fiber management assembly of a telecommunications closure. The basket has one or more improvements over existing baskets without a reduction or degradation in fiber storage capacity or other basket function, such as the interfacing of the basket with a support structure of the fiber management assembly. For example, a fiber loop storage basket according to the present disclosure can be lighter weight and/or more cost effective to manufacture than existing metal fiber loop storage baskets, while being compatible with the same support structure that supports an existing metal fiber loop storage basket.

According to an aspect of the present disclosure, a fiber loop storage basket of a fiber management assembly is constructed entirely of a molded polymeric material, (e.g., plastic) rather than metal.

According to another aspect of the present disclosure, all features of a fiber loop storage basket of a fiber management assembly, including the interface features for attaching the basket to a support structure of the assembly, are of uniform, seamless, molded polymer construction.

According to certain specific aspects of the present disclosure, a basket for a fiber management assembly of a telecommunications closure, the basket extending from a bottom to a top along a first axis, from a first side to a second side along a second axis, and from a front to a back along a third axis, includes: a basket volume configured to store loops of optical fibers; and a basket mounting portion configured to mount the basket to a tower configured to pivotally support fiber management trays, the basket mounting portion including a pair of resilient latch arms having catches and a keying tab defining a keying notch.

According to further specific aspects of the present disclosure, a fiber management assembly of a telecommunications closure, the assembly extending from a bottom to a top along a first axis, from a first side to a second side along a second axis, and from a front to a back along a third axis, includes: a tower including receivers and a tower mounting portion, the tower mounting portion including: a pair of arms; a slot defined between the arms; a shoulder defined by one of the arms; a stabilizing body having tapered sides positioned in the slot; and a stabilizing tab including a male keying feature positioned in the slot; fiber management trays having pins positioned in the receivers, the pins being pivotal within the receivers; and a basket constructed entirely of plastic and mounted to the tower, the basket including: a basket volume configured to store loops of optical fibers; and a basket mounting portion at least a portion of which is positioned in the slot, the basket mounting portion including: a pair of resilient latch arms having catches engaging the shoulder to inhibit upward movement of the basket relative to the tower; and a keying tab defining a keying notch that receives the male keying feature, and wherein edges of the keying tab abut edges of the stabilizing tab to inhibit downward movement of the basket relative to the tower According to further specific aspects of the present disclosure, a system includes: a tower including a tower mounting portion and receivers configured to pivotally support fiber management trays, the tower mounting portion including: a pair of arms; a slot defined between the arms; a shoulder defined by one of the arms; a stabilizing body having tapered sides positioned in the slot; and a stabilizing tab including a male keying feature positioned in the slot; a metal basket defining a basket volume configured to store loops of optical fibers; and a plastic basket defining a basket volume configured to store loops of optical fibers, wherein each of the metal basket and the plastic basket includes a basket mounting portion configured to mount to the tower mounting portion.

According to further specific aspects of the present disclosure, a method includes, securing a mounting adapter to a plastic fiber loop storage basket and, thereafter; mounting the basket to a tower mounting portion of a tower of a fiber management assembly, the tower configured to pivotally support optical fiber management trays.

As used herein, mounting refers to direct mounting between the components. For example, as used herein, that a first component includes structures for mounting a second component means that the second component can be directly mounted to the structures of the first component without any need for an additional or intermediating component to perform the mounting.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of particular embodiments of the present disclosure and therefore do not limit the scope of the present disclosure. The drawings are not necessarily to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
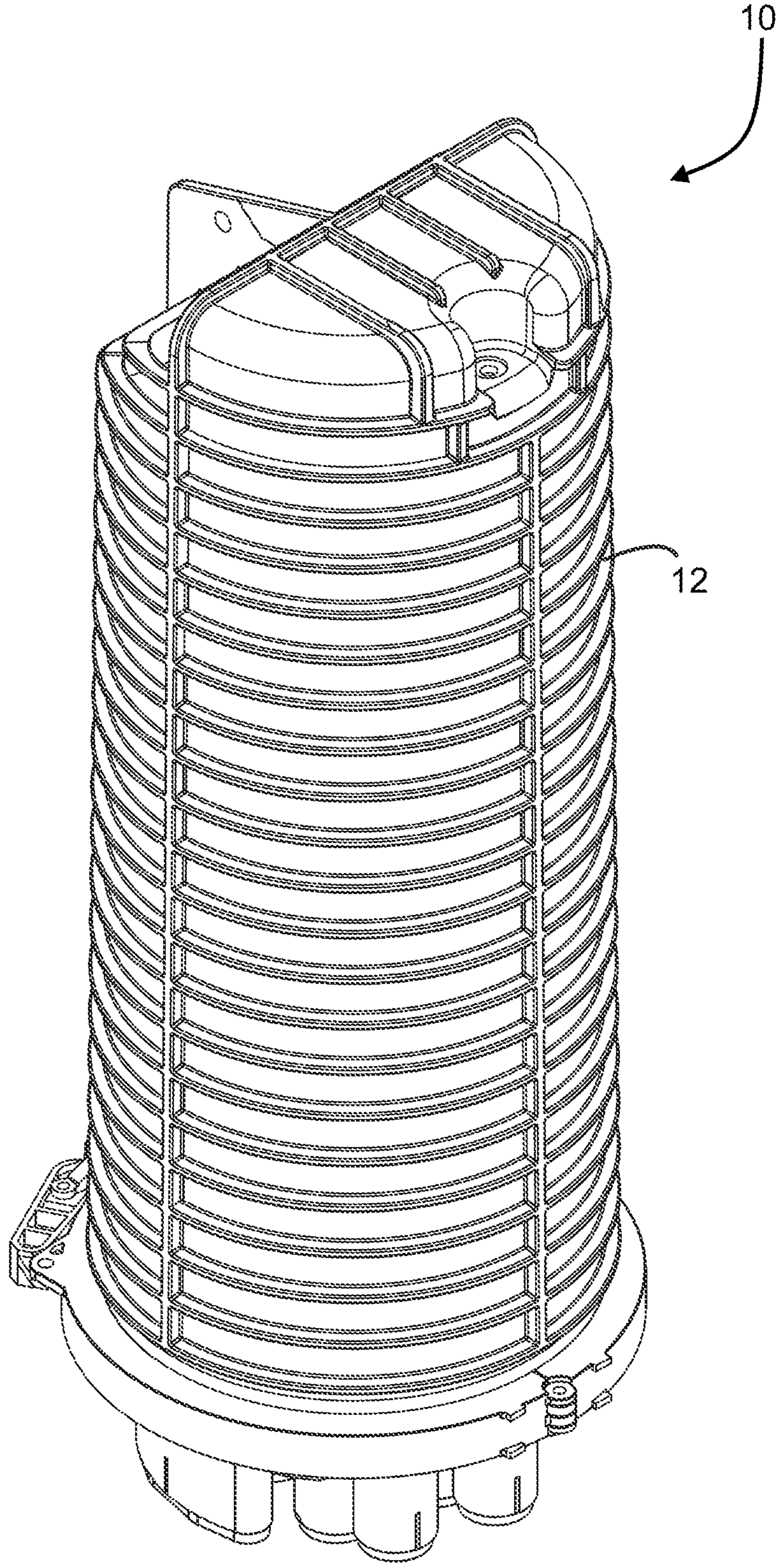
FIG. 1 is a perspective view of an example telecommunications closure that can support an optical fiber management assembly according to the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Any examples set forth in this specification are not intended to be limiting and merely set forth some of the many possible embodiments for the claimed invention.

Figure 2:
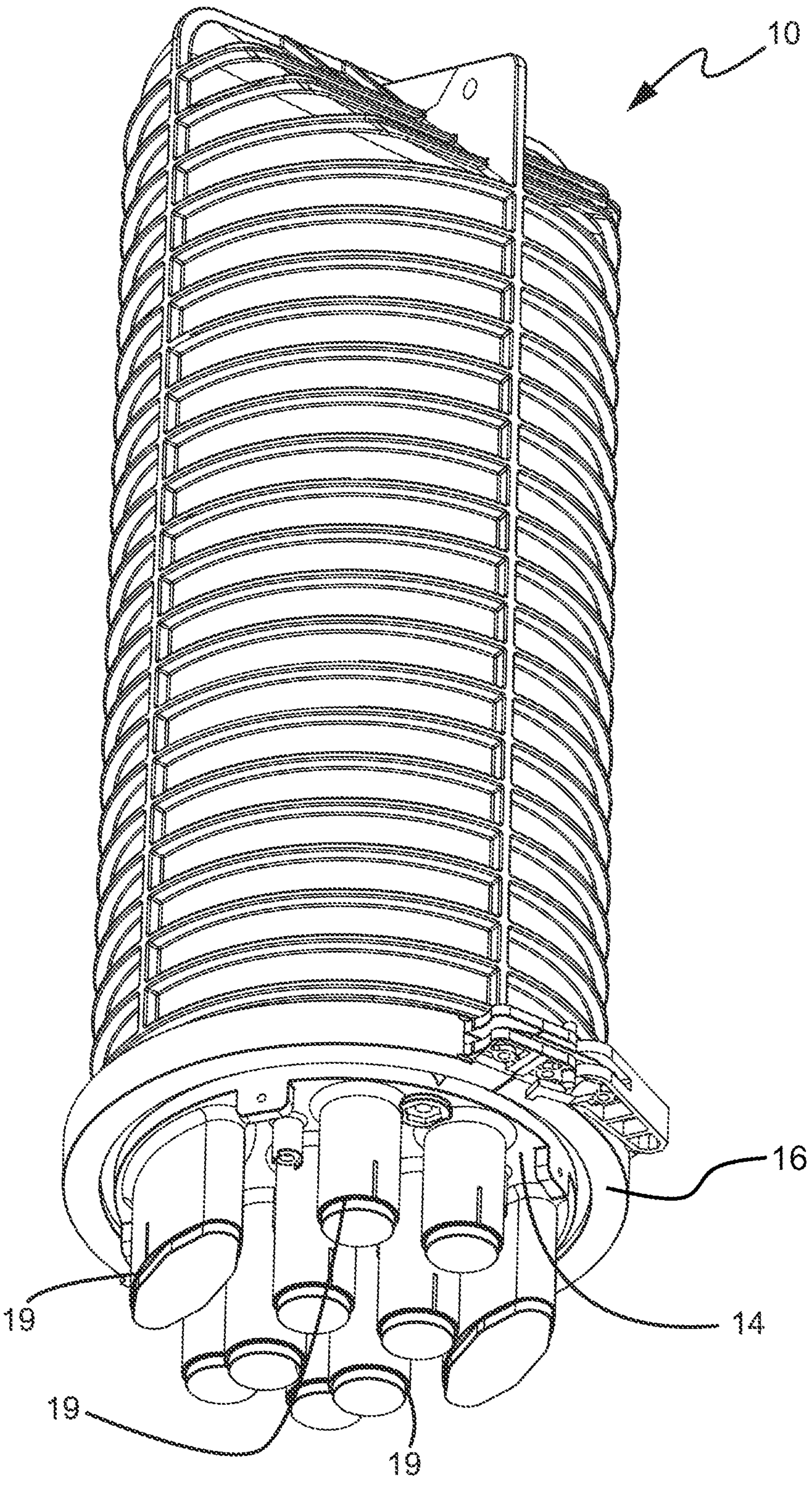
FIG. 2 is a further perspective view of the closure of FIG. 1.

Referring to FIGS. 1-2, an example telecommunications closure 10 is shown. The closure 10 defines an interior closure volume that is sealable and re-enterable.

The closure 10 includes a first housing piece 12 (in this case, a dome), and a second housing piece 14 (in this case, a base) configured to cooperate with the first housing piece to define a sealable and re-enterable closure volume defined primarily by interior surfaces of the dome 12 for managing optical fibers. In particular, the first and second housing pieces 12, 14 define an interior closure volume in which other fiber managing equipment, including an optical fiber management assembly according to the present disclosure, can be positioned.

A clamp ring 16 having a clamp (or other securing mechanism) can be used to clamp and seal together the housing pieces 12 and 14. A sealing element, such as a strip seal or O-ring can be positioned at the junction between the housing pieces 12 and 14 and compressed by the clamp ring 16 to form a seal.

Cables carrying optical fibers can enter the closure volume via sealable ports 19 defined by the base 14. Such cables can include trunk cables, feeder cables, branch cables, and distribution cables (also known as drop cables). Typically, optical fibers from one cable entering the closure are spliced or otherwise optically connected (e.g., with optical fiber connectors) to optical fibers of one or more other cables entering the closure to establish an optical signal path at the closure 10 from a provider side cable to one or more customer side cables, or an optical signal path between a branch cable and any of: another branch cable, a trunk cable, a feeder cable, or a distribution cable. Branch cables can be used to route optical signals from one telecommunications closure to multiple other telecommunications closures.

Splices, such as mechanical splices or fusion splices, can be performed at the factory or in the field, e.g., at the closure 10 positioned in the field.

In addition to splicing, other fiber management activities can be performed with the fiber management assembly housed within the closure volume. Such activities can include, without limitation, indexing fibers, storing fibers (typically in one or more loops) for later use or as slack of active fibers, and splitting fibers.

Instead of splices, optical fibers can be connected to each other via connectorized ends. Connector to connector optical connections can also be supported with a fiber management assembly housed within a closure volume. Connectors terminate the fibers and are installed in adapters supported on fiber management trays of the assembly to establish optical continuity between the installed connectorized fibers. In some examples, the connectors can include ferrules that terminate the fibers. In other examples, the connectors do not include ferrules.

The cables entering the closure can include optical fibers of different configurations such as loose fibers and fiber ribbons. The fiber ribbons can be flat ribbons or rollable ribbons. The loose fibers can be individual fibers or bundled loose fibers protected by a common protective sheath or tube. For fiber ribbons, the fibers of the entire ribbon can be spliced to the fibers of a corresponding fiber ribbon at the same time, e.g., using a mass fusion splicing procedure.

Splice bodies protect the splices both in the case of individual fiber splices and mass fiber splices, such as mass fusion splices. The splice bodies are held in splice holders also known as splice chips. Fiber management trays of a fiber management assembly positioned in the interior sealable and re-enterable volume defined by the closure 10 can support such splice holders (or chips).

As used herein, positioning and orientational terms such as up, down, upper, lower, above, below, front, back, rear, forward, backward, rearward, horizontal, vertical, and so forth, may be used to refer to relative positioning of components in an assembly or portions of a component relative to each other when positioned in an assembly. Such terminology is provided as a descriptive aid and does not limit how components or portions of components may be positioned or oriented in practice.

Figure 3:
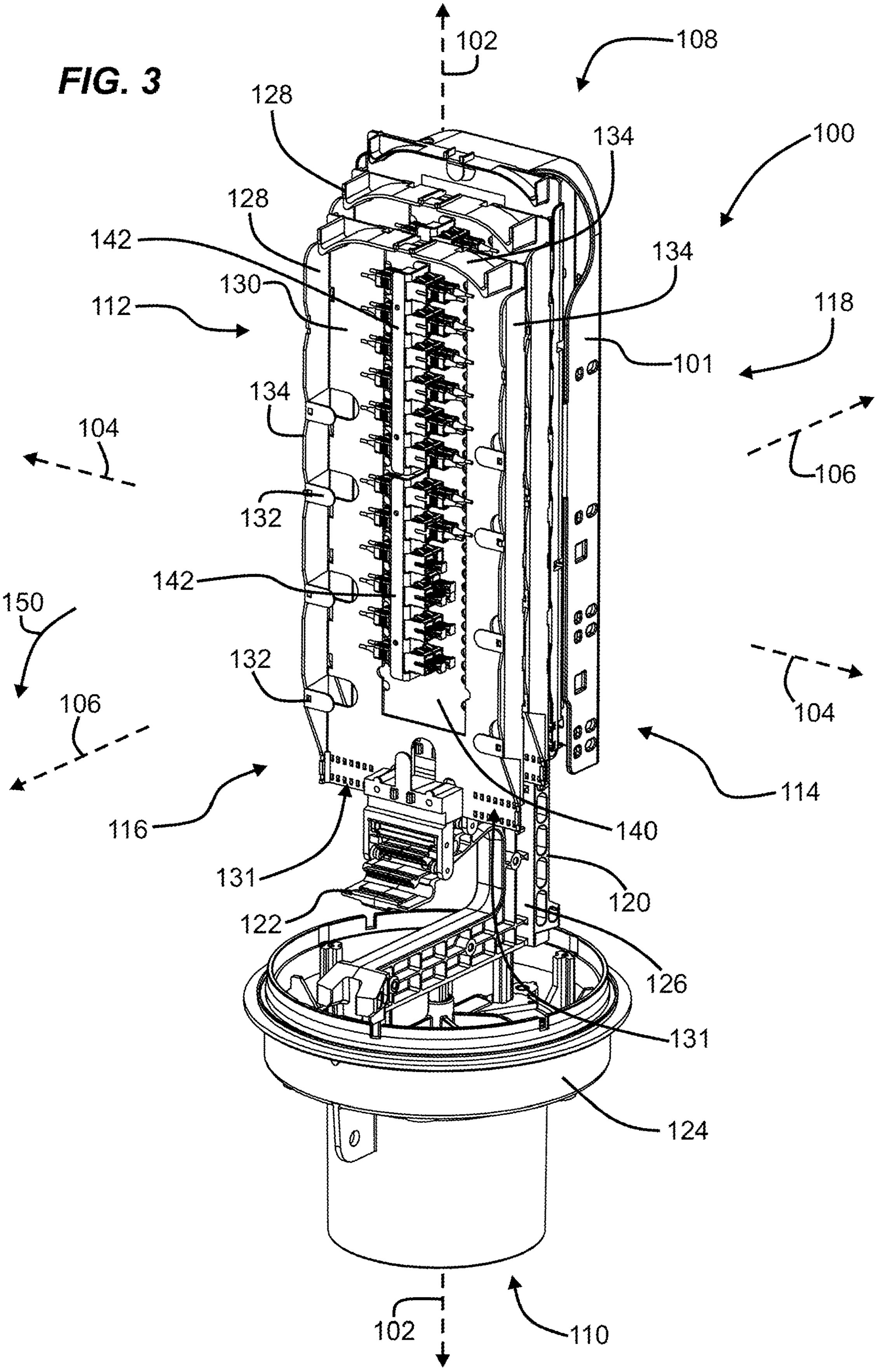
FIG. 3 is a perspective view of an example optical fiber management assembly according to the present disclosure.
Figure 4:
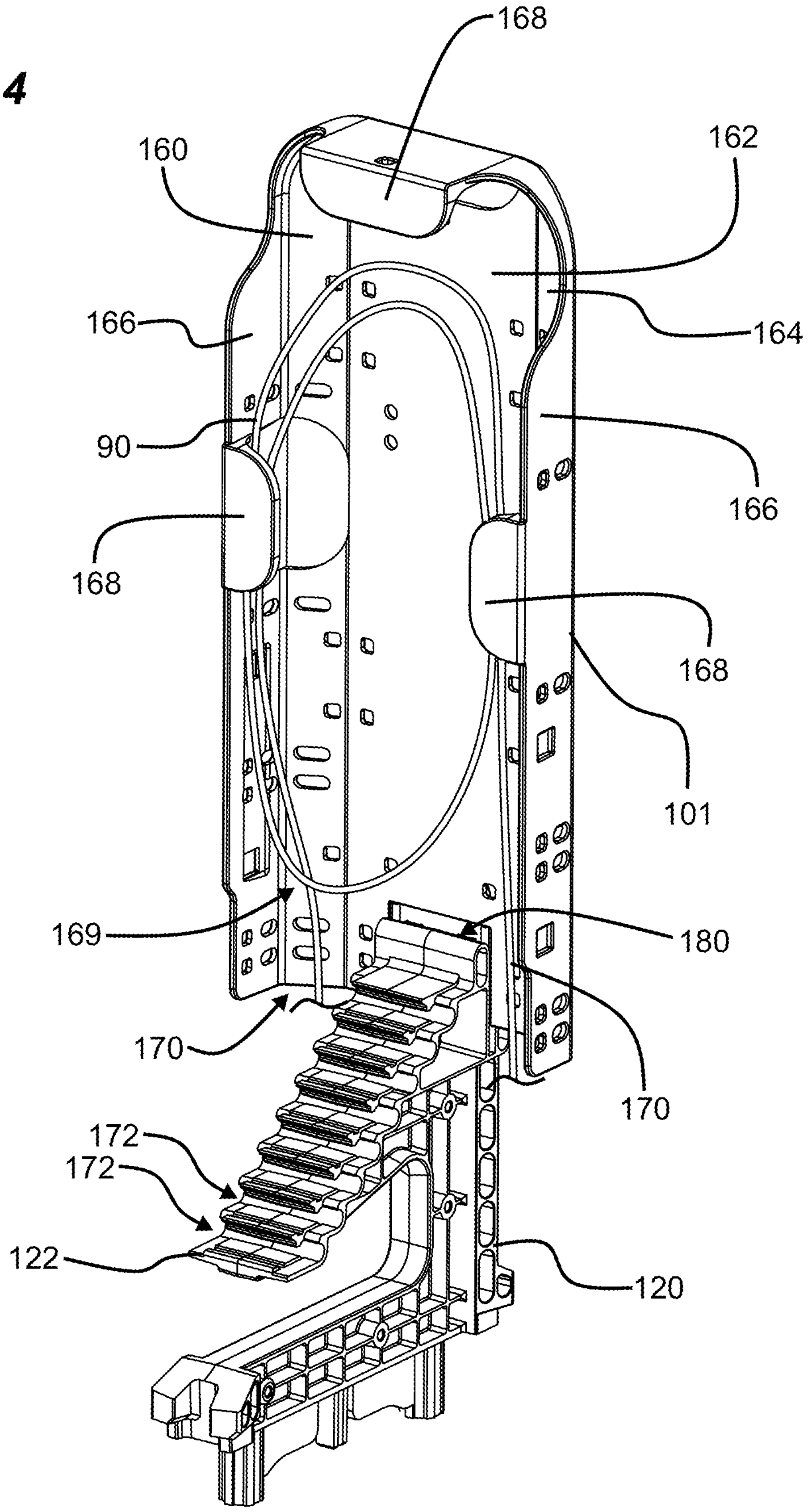
FIG. 4 is a perspective view of a portion of the assembly of FIG. 3.
Figure 5:
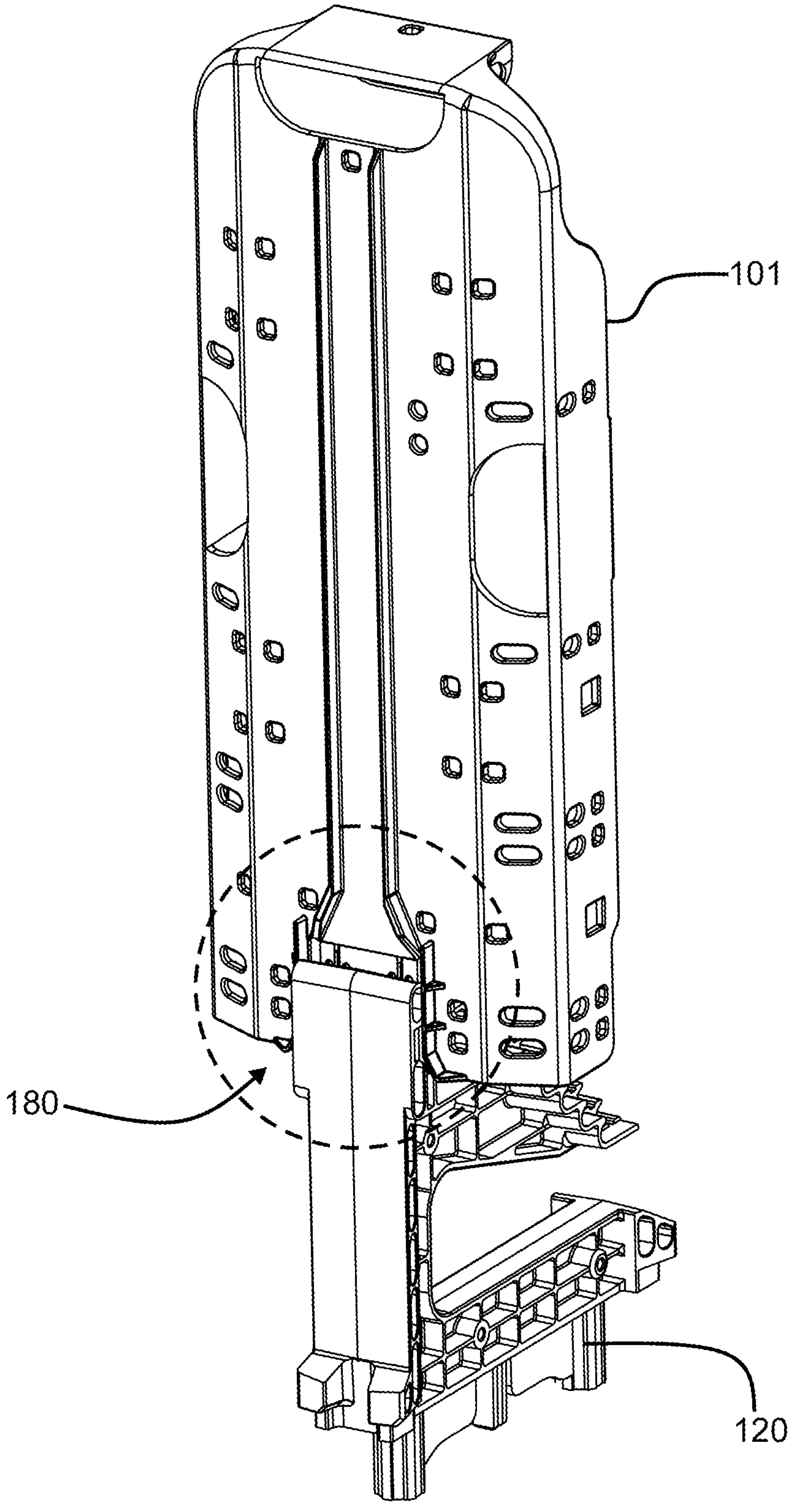
FIG. 5 is a further perspective view of the portion of the assembly of FIG. 4.
Figure 6:
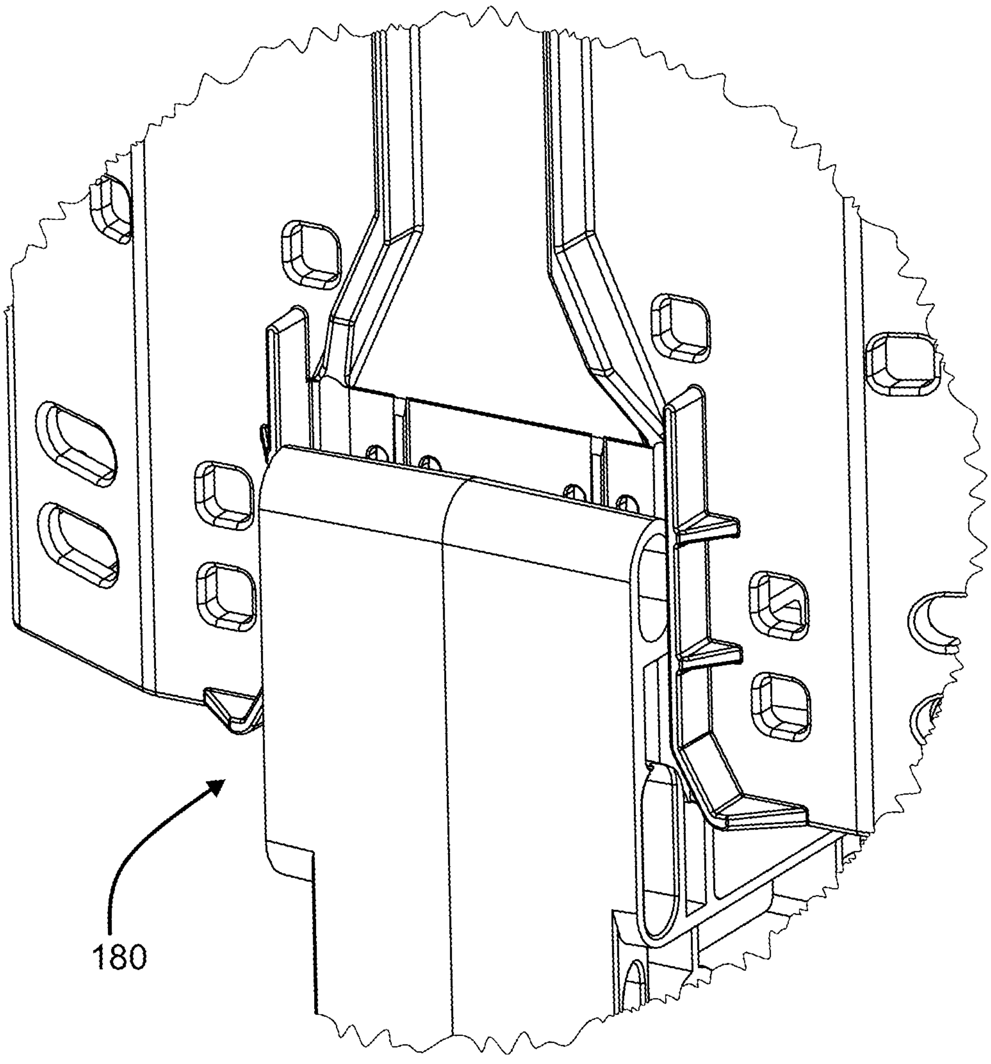
FIG. 6 is an enlarged view of the called-out area of FIG. 5.
Figure 7:
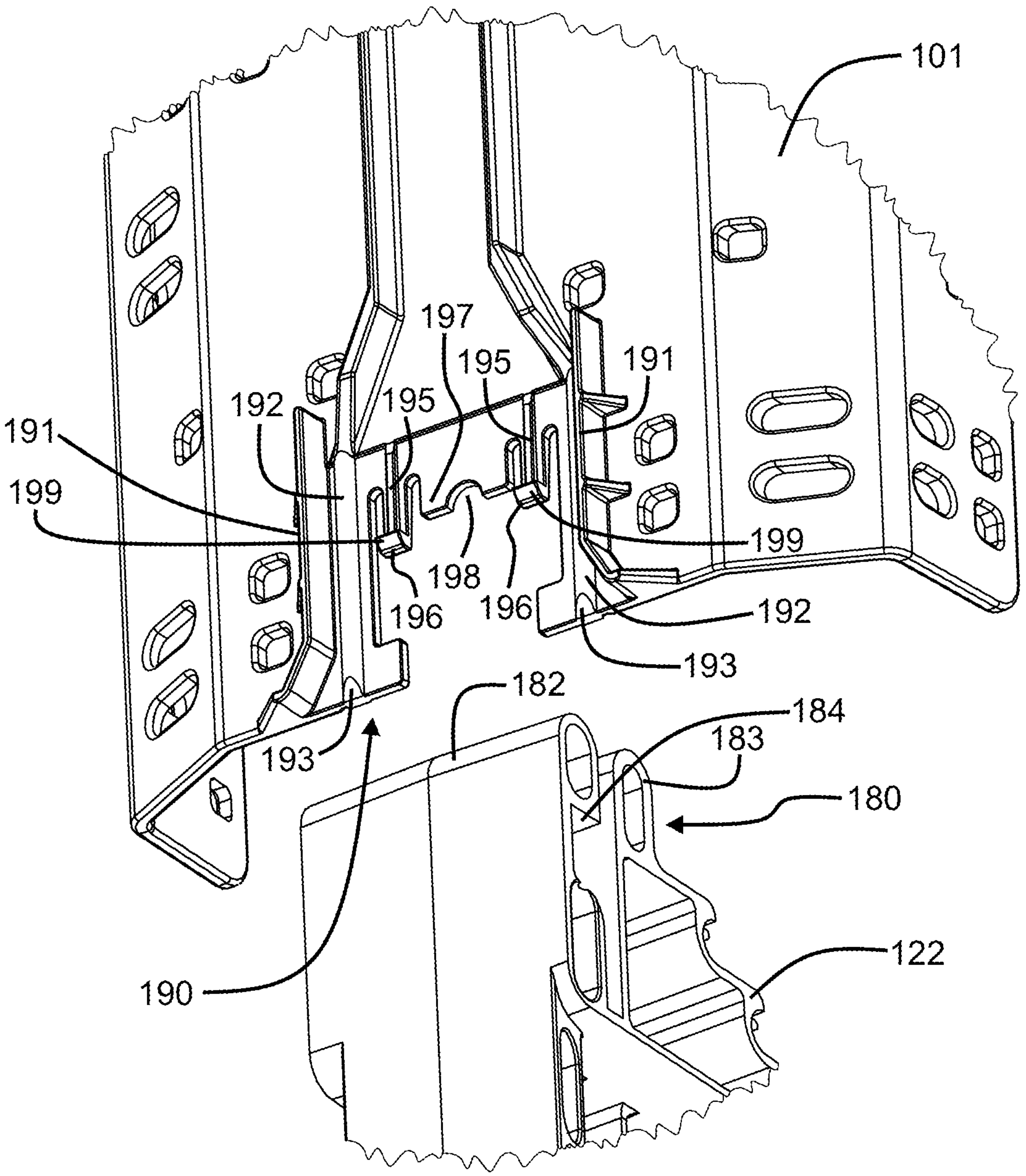
FIG. 7 is an enlarged view of the called-out area of FIG. 5, but showing the basket and the support structure separated from each other.
Figure 8:
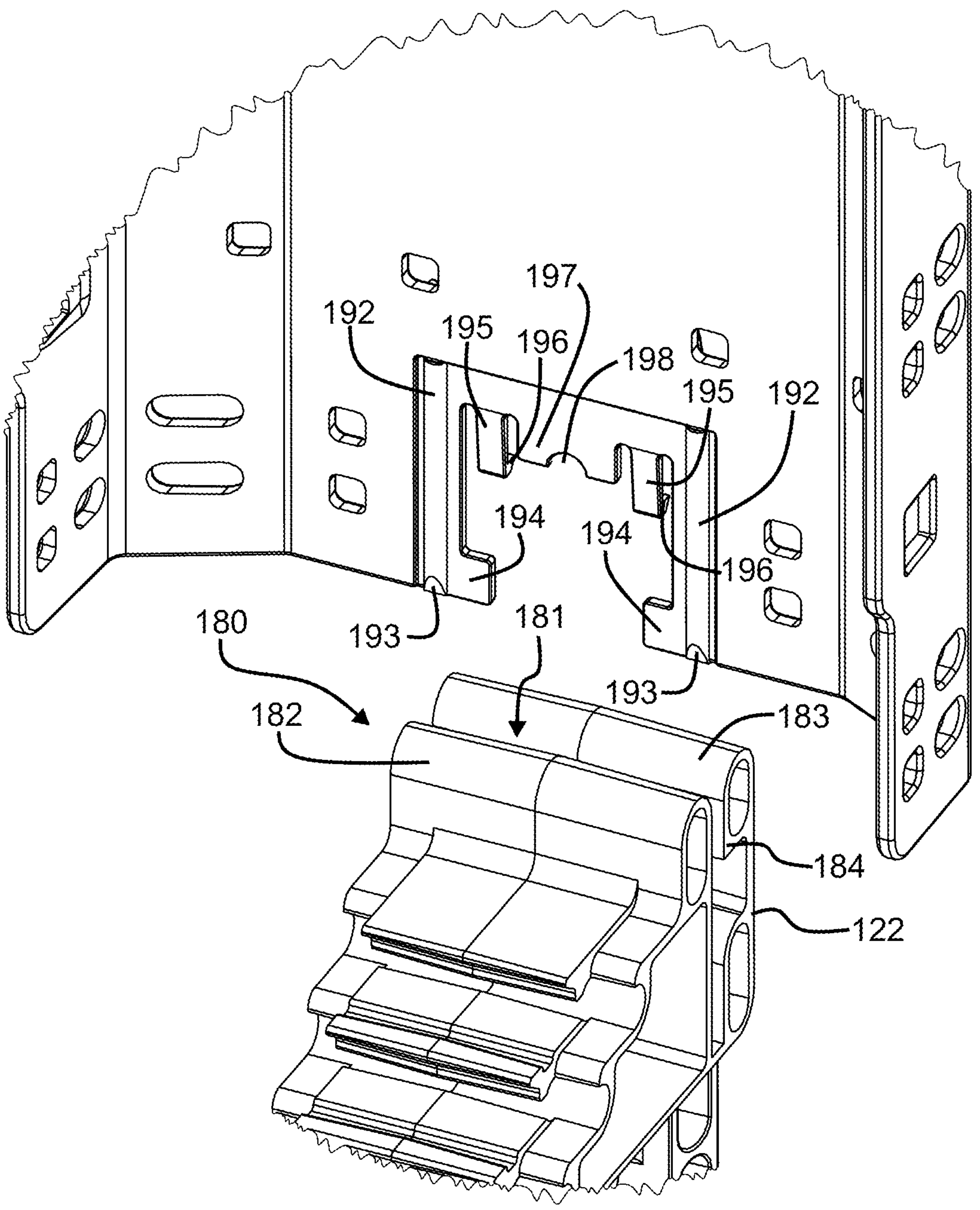
FIG. 8 is a further perspective, enlarged view of portions of the basket and the support structure of FIG. 7 separated from each other.
Figure 9:
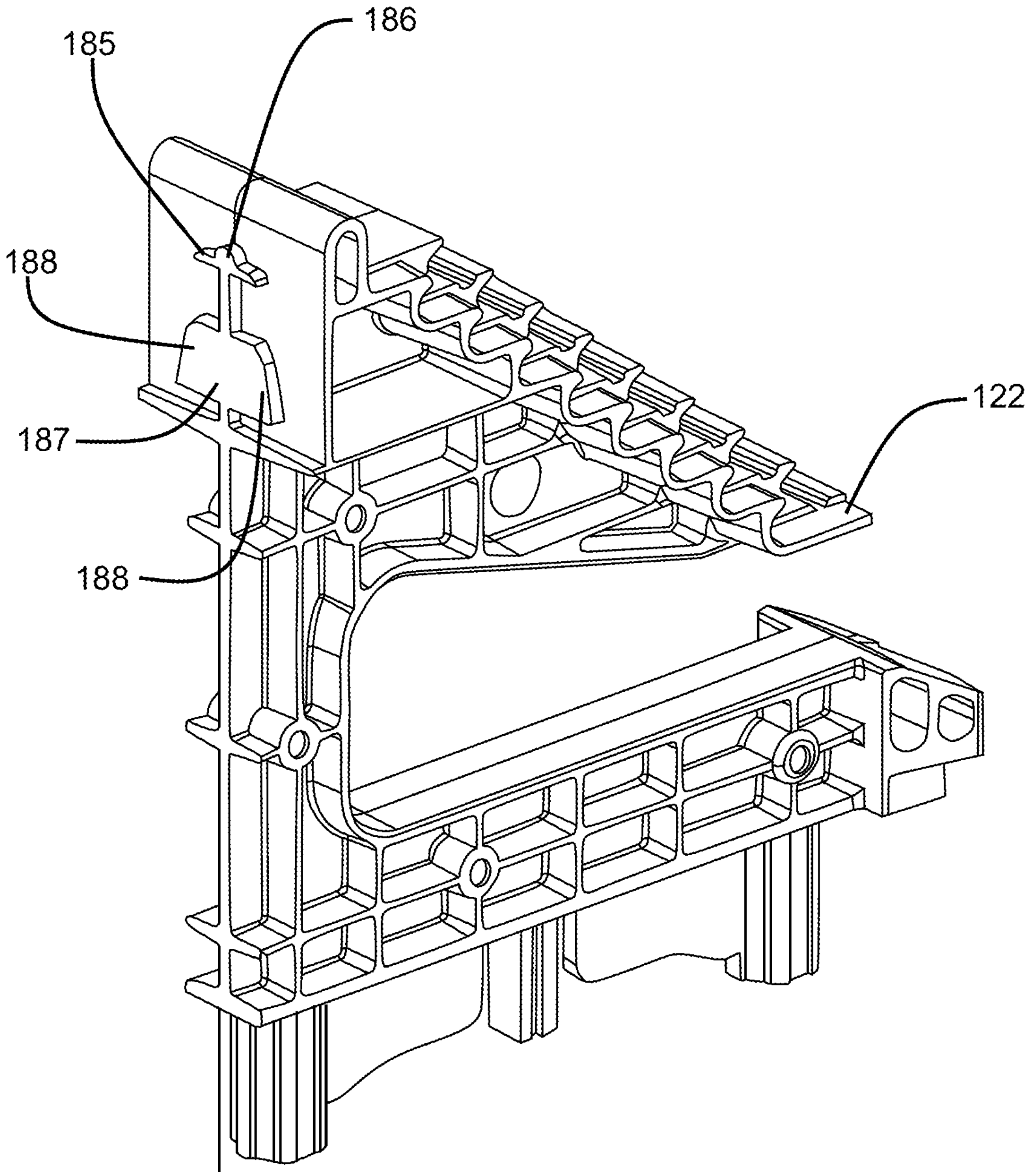
FIG. 9 is a cross-sectional view of the support structure of the assembly of FIG. 3.
Figure 10:
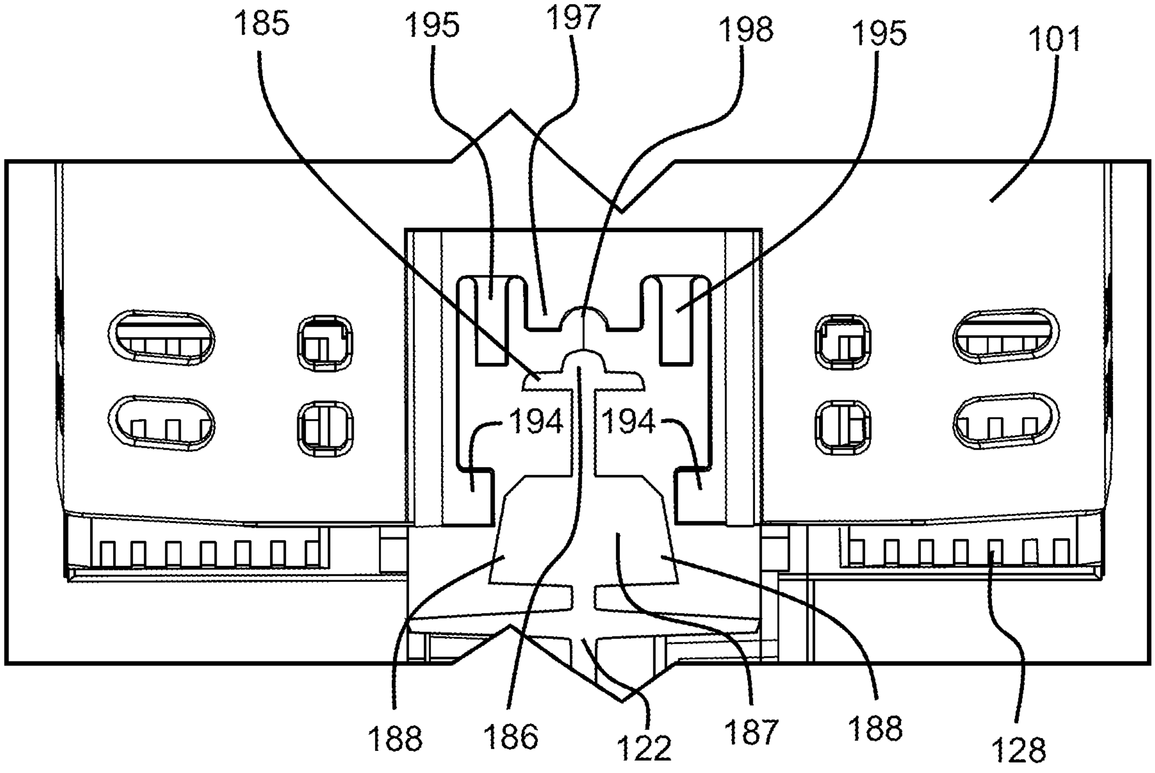
FIG. 10 is a cross-sectional view of portions of the basket and the support structure of the assembly of FIG. 3 during mounting of the basket to the support structure.

Referring now to FIG. 3, an assembly 100 in accordance with the present disclosure will be described. Portions of the assembly 100 can be housed in a sealable and re-enterable closure volume of a telecommunications closure, such as within the interior of the dome 12 of FIG. 1.

Components of the assembly 100 can provide one or more advantages in manufacturing cost and efficiency, weight reduction, assembly cost and efficiency, and interchangeability of components. For example, a metal loop storage basket can be removed from a fiber management assembly of a telecommunications closure and replaced with a plastic loop storage basket according to the present disclosure, with the plastic basket mounting at the same location as the metal basket. The plastic loop storage basket can provide the same functionality as the metal basket with respect to fiber management capacity and capability, as well as mounting strength and durability, while being advantageously lighter weight and/or more cost effective to manufacture and/or ship than the metal basket.

Due to differences in material characteristics between metal and plastic, the mounting interface of the plastic basket according to the present disclosure is configured differently from the corresponding mounting interface of the metal basket it can replace. The mounting interface refers to the mounting structures of the basket that interface with the support structure (e.g., a tower) of the fiber management assembly to lockingly and securely mount the basket to the rest of the assembly.

Additional advantages will be borne out by the present disclosure.

One or more pieces of the assembly 100 are constructed of a molded polymeric material, e.g., a thermoplastic. For example, the assembly 100 includes a basket 101. The basket 101 can be constructed, in its entirety, of a molded polymeric material.

The assembly 100 defines a first axis, or vertical axis 102, a second axis 104, and a third axis 106. The first axis 102, the second axis 104, and the third axis 106 are mutually perpendicular. The second axis 104 and the third axis 106 define a horizontal plane. The assembly 100 extends from a top 108 to a bottom 110 along the first axis 102. The assembly 100 extends from a first side 112 to a second side 114 along the second axis 104. The assembly 100 extends from a front 116 to a back 118 along the third axis 106.

The assembly 100 includes a support structure 120 that mounts to a base 124. The base 124 can correspond to a housing piece of a closure. For example, the base 124 can correspond to the housing piece 14 of FIG. 1. The support structure 120 includes a body 126 that supports a tower 122.

Pivotally coupled to the tower 122 are fiber management trays 128. The trays can be mounted to the tower 122 in a stack of two or more of the trays 128. Each tray 128 includes a fiber management surface 130 and one or more perimeter walls 134 extending away from (e.g., perpendicular to) the surface 130 and defining an outer perimeter of the surface 130. The surface 130 and the wall(s) 134 define an interior tray volume for fiber management.

Each tray 128 includes fiber retainer lips 132 extending from one or more of the walls 134 to retain fibers routed on the tray 128 within the interior tray volume between the surface 130 and the lips 132. Fibers (such as fibers 60) are routed onto the tray via tray entryways 131, and then routed on the surface 130 (or between the surface 130 and the lips 132) to a fiber management region 140 defined by the tray 128.

The fiber management region 140 can support one or more fiber management components, such as splice body holders (e.g., splice chips) for supporting and securing splice bodies that protect splices between the optical fibers. The fiber management region 140 can support one or more signal splitters. The fiber management region 140 can support modules containing one or more adapters for receiving connectorized ends of the fibers. In the example tray 128, the fiber management region 140 supports modules 142 that include adapters 144 for receiving and providing optical connectivity to fibers 60 terminated with connectors 146 that are installed in the adapters 144. The fiber management region 140 can include structures (such as resilient latches and dovetail couplers) for securely mounting fiber management components, such as those just described. A given tray can support a single type of fiber management component or any combination of types of fiber management components.

Each tray 128 is pivotally mounted to the tower 122. Therefore, for example, the front tray 128 can be pivoted frontwards and downwards (in the direction of the arrow 150) to provide access to the fibers and fiber management components positioned or to be positioned on the tray 128 that is behind the front tray.

Cables carrying optical fibers enter the closure volume through the bottom of the base 124 via sealed ports defined by the base 124. The jackets of the cables are stripped and their end portions affixed to cable fixation devices or other structures to secure the cables to the base 124 and/or another part of the assembly 100. Optical fibers held by the cables extend beyond the ends of the cable jackets and can be routed to the basket 101 for storage and/or to a tray 128 for other management, such as splice support, or connector to connector optical connectivity with fibers of one or more other cables entering the closure volume.

Referring to FIGS. 3-10, the basket 101 securely mounts to the support structure 120 that includes the tower 122.

The basket includes surfaces 160, 162, 164, one or more walls 166 that extend(s) from outer edges of the surfaces 160, 162, 164, and retainer lips 168 that extend from the wall(s) 166 to define a basket storage volume 169 for storing loops of optical fibers, e.g., loops of sheathed optical fibers. For example, a sheath 90 of optical fibers is schematically illustrated stored in loops in the basket storage volume between the surfaces 160, 162 and 164 and the lips 168. Sheaths 90 of fibers can be routed directly from the ends of cable jackets fixed to the assembly 100, or from another portion of the assembly 100, and enter and exit the basket storage volume 169 via basket entryways 170 on either side of the basket 101. The loops and/or partial loops of sheath fibers can be stored in the basket storage volume 169 for potential future active optical connectivity needs. In addition, or alternatively, slack of actively connected optical fibers can be stored in the basket storage volume 169.

The basket 101 securely mounts to the support structure 120. In the example shown, the basket 101 mounts to the support structure 120 such that the basket storage volume 169 faces frontwards. In some examples, the support structure and the basket 101 are configured for alternatively mounting the basket 101 to the support structure with the basket storage volume 169 facing rearwards, in addition to frontwards. Selection of a frontward or rearward facing basket storage volume can be based on a specific fiber routing needs for a given closure.

The body 126 of the support structure includes the tower 122. The tower 122 defines an angled set of receivers 172 (e.g., angled obliquely to the axes 102 and 106). The angled arrangement of receivers 172 reduces interference between trays between pivoted out and stacked configurations, allowing all trays to be pivoted out sufficiently to provide adequate access to the tray behind it. Each receiver 172 is configured to lockingly receive, in pivoting fashion, a pin or bar of a fiber management tray, such as a tray 128, and such that the tray can pivot while remaining coupled to the tower 122. Pivot stop mechanisms can be attached to the tray to selectively stop pivoting from a given position, e.g., while work is being performed on a tray.

The tower 122, or the body 126, of the support structure 120, includes a mounting portion 180. In the example shown, the mounting portion 180 is positioned at an end (e.g., an upper, rear end) of the angled set of receivers 172. The mounting portion 180 is configured to securely mount a metal basket of identical or substantially identical dimensions as the plastic basket 101. The mounting portion 180 is also configured to securely mount the plastic basket 101.

The basket 101 includes a mounting portion 190 unitarily constructed therewith. The mounting portion 190 of the basket 101 is complementary to the mounting portion 180 of the tower 122. Due to differences in material characteristics, and the need for strength and security in the mounting connection between basket and tower, the mounting portion 190 includes mounting structures not present in a metal basket that could interchangeably mount to the mounting portion 180.

Various mounting structures or features of the mounting portion 190 will now be described. It will be appreciated that, in some examples, not all of the features may be required for adequately securing the basket to the tower.

The mounting portion 190 of the basket 101 includes lateral stabilizing walls 191. The mounting portion 190 includes front-to-back stabilizing ribs 192 at the rear and at the front of the basket 101. The ribs 192 includes angled ramps 193 to facilitate insertion of the mounting portion 190 into engagement with the slot of the mounting portion 180 of the tower 122. The mounting portion 190 includes lateral stabilizing tabs 194 that oppose each other. The mounting portion 190 includes resilient latch arms 195 on opposite sides of a keying tab 197, each including a catch 196 that includes a ramped surface 199. The mounting portion 190 includes the keying tab 197, which defines a keying notch 198. In this example, the keying notch is semi-circular in shape. Other shapes, (e.g., a triangle, a trapezoid, a rectangle, a portion of an ellipse, etc., are possible).

In some examples, sufficiently strong and durable mounting of the basket to the tower 122 can be achieved with a basket mounting portion that does not include the lateral stabilizing walls 191, and/or does not include the stabilizing tabs 194, and/or does not include all of the ribs 192 (e.g., just one, two or three ribs are provided). In some examples, additional latch arms can be provided and/or positioned in a different locations than as shown for the latch arms 195 of the mounting portion 190.

The mounting portion 180 of the tower includes a slot 181 defined between a front arm 182 of the tower 122 and a rear arm 183 of the tower 122. The mounting portion 180 includes a shoulder 184 formed on the rear arm 183 and positioned within the slot 181. The mounting portion 180 includes a stabilizing tab 185 positioned within the slot 181, and a male keying feature 186 extending from the tab 185. The keying feature 186 has a shape that complements the keying notch 198. The mounting portion 180 includes a tapered stabilizing block 187 positioned within the slot 181. The block 187 has tapered sides 188.

To securely mount the basket 101 to the tower 122, the mounting portion 190 is received in the slot 181. The mounting portion 190 is inserted into the slot 181 until the latch arms 195 flex and then resiliently return to an unflexed configuration in which the catches 196 catch under the shoulder 184. The ramps 199 allow the latch arms 195 to ride along an interior surface of the arm 183 until the catches 196 clear the shoulder 184 and then engage underneath the shoulder. Meanwhile, the ribs 192 frictionally engage interior surfaces of the arms 182 and 183 to provide front-to-back stability (e.g., stability parallel to the axis 106 in both directions) of the basket relative to the tower and/or side-to-side stability (e.g., stability parallel to the axis 104 in both directions) of the basket 101 relative to the tower 122. In addition, the tabs 194 engage and slide downward along the tapered sides 188 of the block 187 until the tabs 194 firmly frictionally engage the block 187 to provide additional front-to-back stability and/or side-to-side stability of the basket 101 relative to the tower 122. The walls 191 can engage or nearly engage sides of the arm 182 to reinforce side-to-side stability of the basket 101 relative to the tower 122. When the basket 101 is fully installed to the tower 122, the keying feature 186 is received in the notch 198 and edges of the stabilizing tab 185 abut edges of the keying tab 197 for further side-to-side stability of the basket 101 relative to the tower 122.

The interface of the keying feature 186 and the notch 198, as well as the interface of the edges of the stabilizing tab 185 and the keying tab 197 inhibits or prevents further downward movement of the basket 101 with respect to the tower 122.

The interface of the catches 196 of the latch arms 195 with the shoulder 184 inhibits or prevents upward movement of the basket 101 with respect to the tower 122. The basket 101 can be removed from locked engagement with the tower 122 by flexing the latch arms so that the catches 196 disengage the shoulder 184. With the catches thus disengaged, the basket 101 can be lifted upward and removed from the tower 122.

The interface of the keying feature 186 and the notch 198, as well as the interface between the block 187 and the tabs 194 inhibits or prevents side-to-side movement of the basket 101 with respect to the tower 122. In addition, the interface of the walls 191 and the arm 182 can reinforce side-to-side stability of the basket 101 relative to the tower 122. The width of the slot 181, the rigidity of the arms 182 and 183 of the tower 122, and the frictional engagement of the ribs 192 with interior surfaces of the arms 182 and 183 can inhibit or prevent front-to-back movement of the basket 101 relative to the tower 122 and further inhibit or prevent side-to-side movement of the basket 101 with respect to the tower 122.

Figure 11:
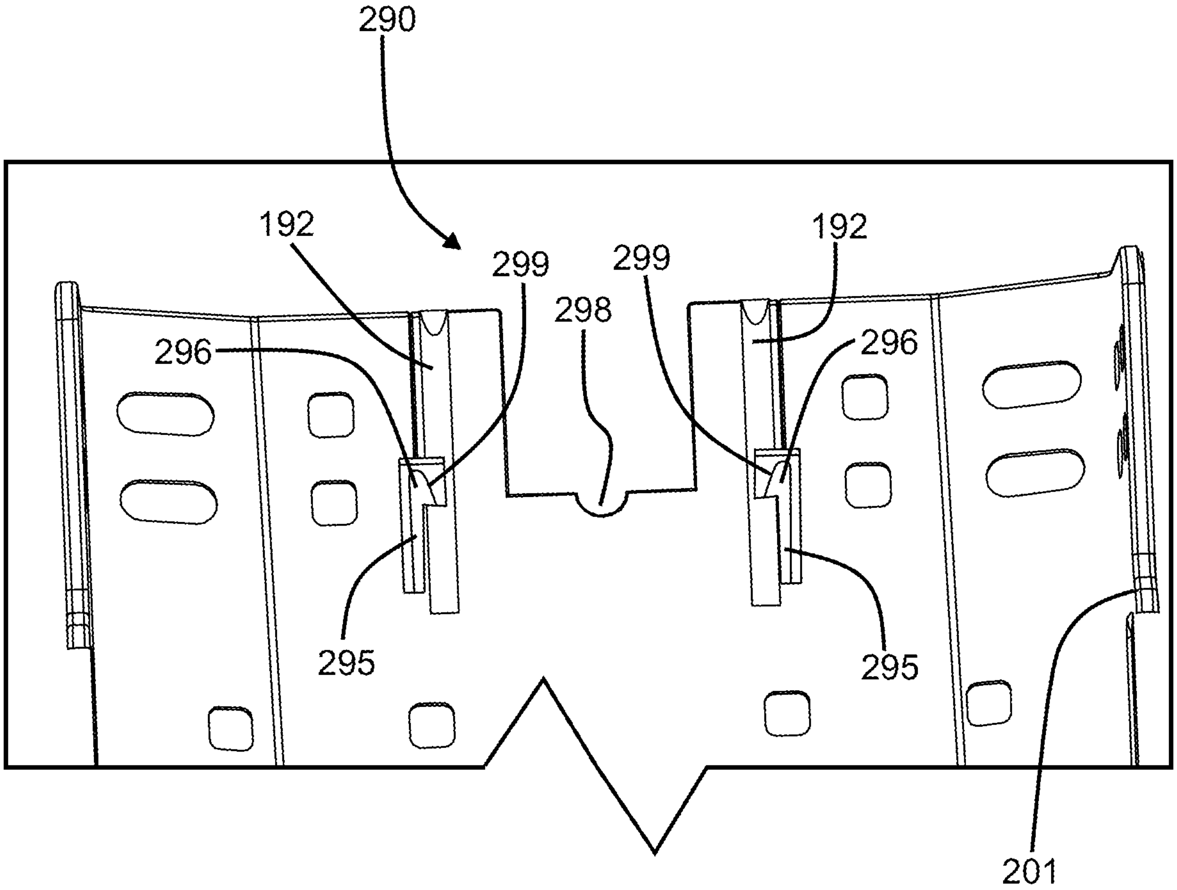
FIG. 11 is a front view of a portion of another example basket in accordance with the present disclosure that can be securely mounted to the support structure of FIG. 3.
Figure 12:
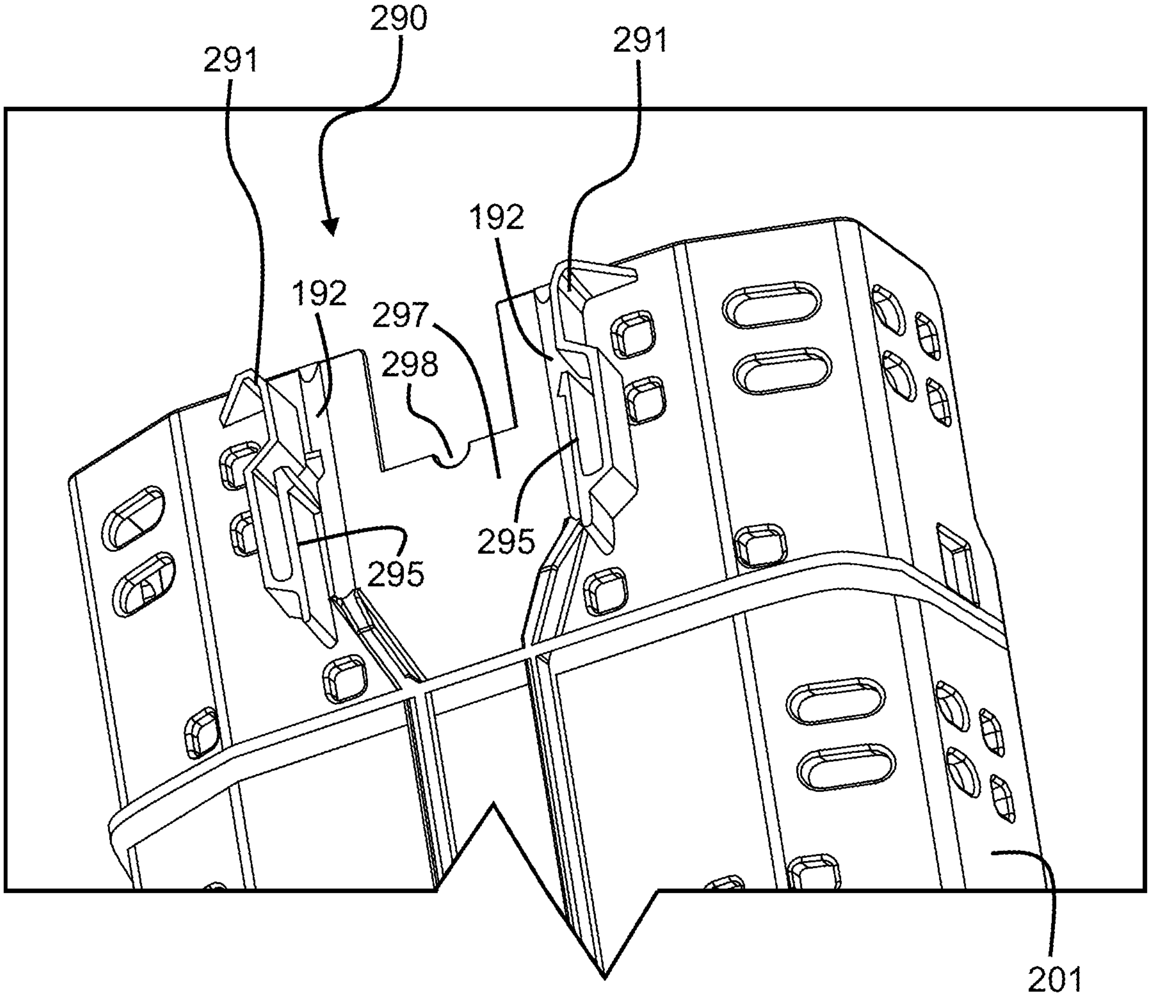
FIG. 12 is a rear, perspective view of a portion of the basket of FIG. 11.

FIG. 11 is a front view of a portion of another example basket 201 in accordance with the present disclosure that can be securely mounted to the support structure 120 of FIG. 3. FIG. 12 is a rear, perspective view of a portion of the basket 201 of FIG. 11.

Referring to FIGS. 11-12, the basket 201 is plastic and of identical construction to the basket 101, with the exception of the mounting portion 290, which performs the same function as the mounting portion 190 and can securely mount the basket 201 to the mounting portion 180 of the tower 122. However, the mounting portion 290 differs structurally from the mounting portion 190 in certain respects.

The mounting portion 290 of the basket 201 includes lateral stabilizing walls 291. The lateral stabilizing walls 291 can perform the same function as the lateral stabilizing walls 191. The lateral stabilizing walls 291 also define the latch arms 295. Unlike the latch arms 195, the latch arms 295 resiliently flex side-to-side (rather than front-to-back). That is, the latch arms 195 flex parallel to each other to latch to the tower 122, while the latch arms 295 flex away from each other and towards each other to latch to the tower 122.

The mounting portion 290 includes the front-to-back stabilizing ribs 192 at the rear and at the front of the basket 201. The mounting portion 290 does not includes lateral stabilizing tabs that oppose each other.

The mounting portion 290 includes the resilient latch arms 295 on opposite sides of a keying portion 297, each latch arm 295 including a catch 296 that includes a ramped surface 199. The mounting portion 290 includes the keying portion 297, which defines a keying notch 298 that functions the same way as the keying notch 198. In this example, the keying notch is semi-circular in shape. Other shapes, (e.g., a triangle, a trapezoid, a rectangle, a portion of an ellipse, etc., are possible).

Figure 13:
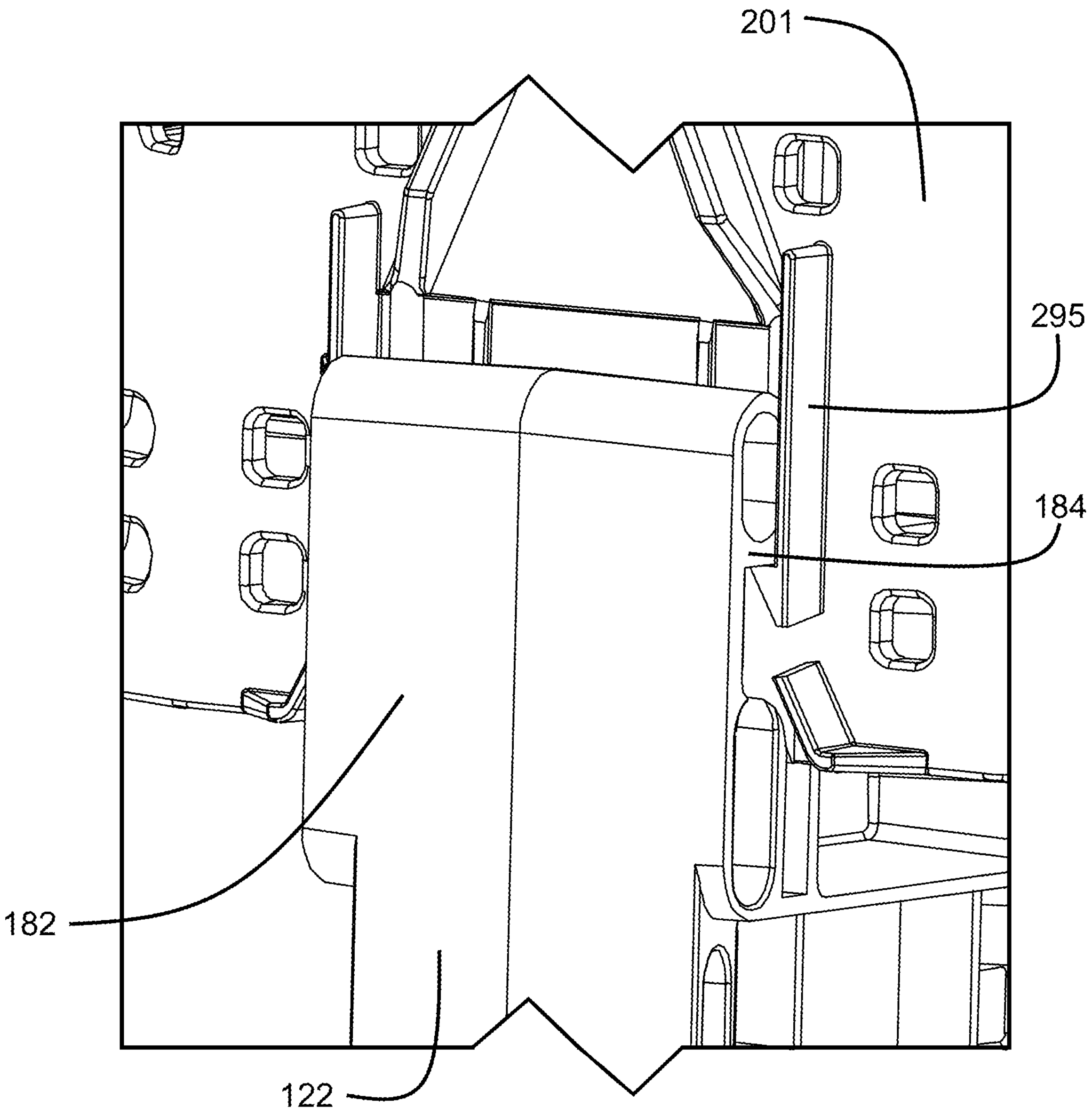
FIG. 13 is a perspective view of a portion of the basket of FIG. 11 mounted to the support structure of FIG. 3.
Figure 14:
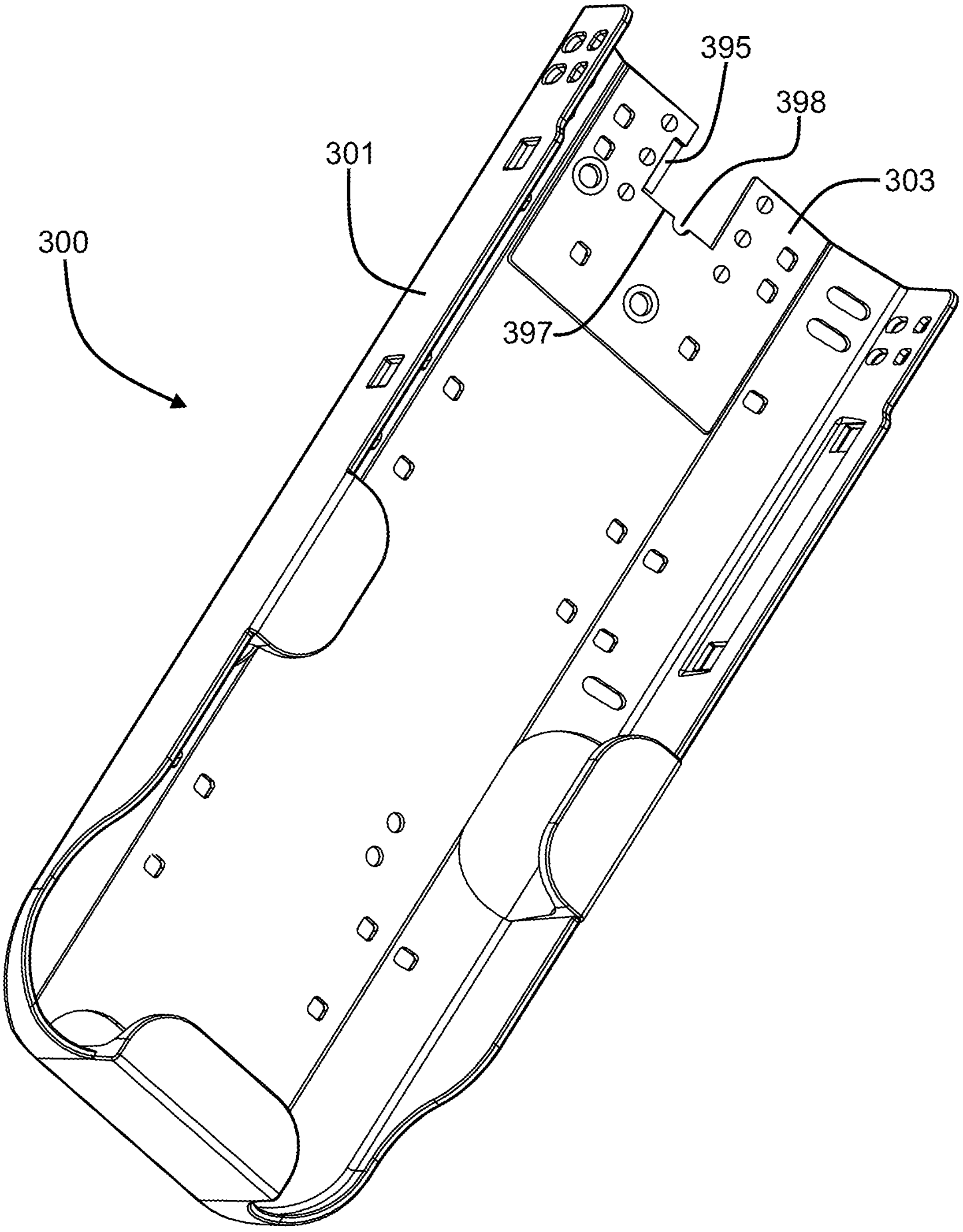
FIG. 14 is a perspective view of an example basket assembly in accordance with the present disclosure that can be securely mounted to the support structure of FIG. 3.
Figure 15:
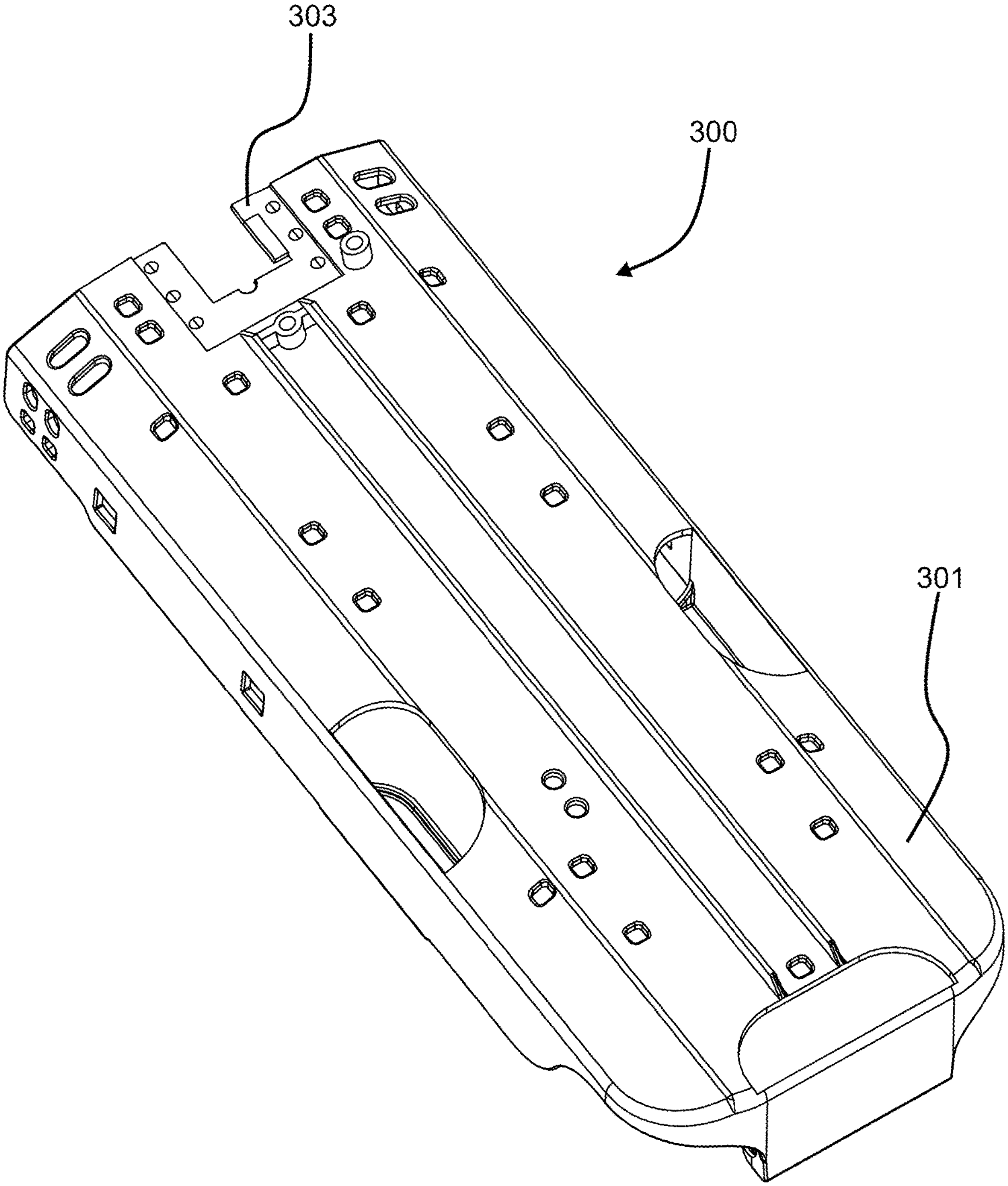
FIG. 15 is a further perspective view of the basket assembly of FIG. 14.
Figure 16:
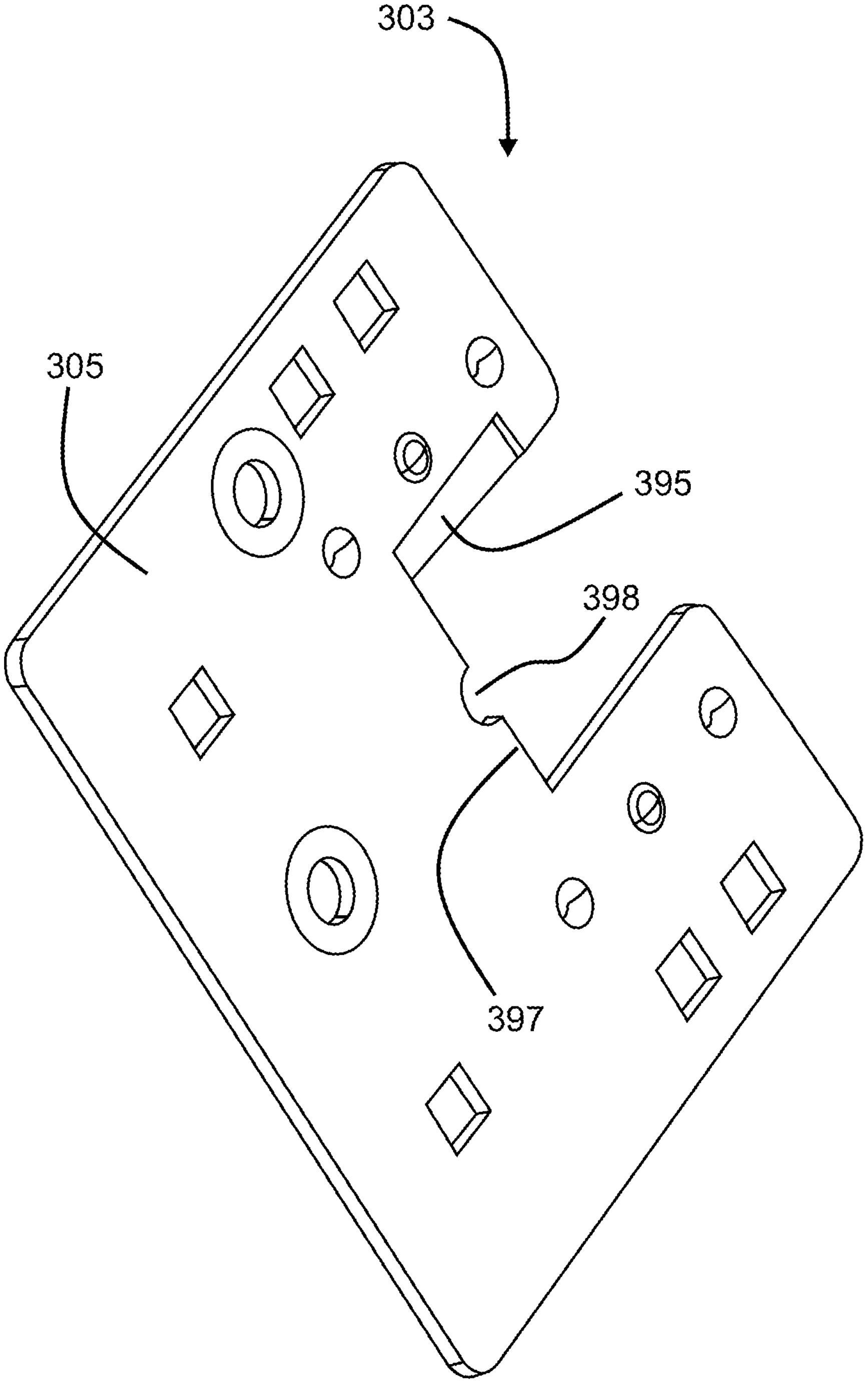
FIG. 16 is a perspective view of the mounting adapter of the assembly FIG. 14.
Figure 17:
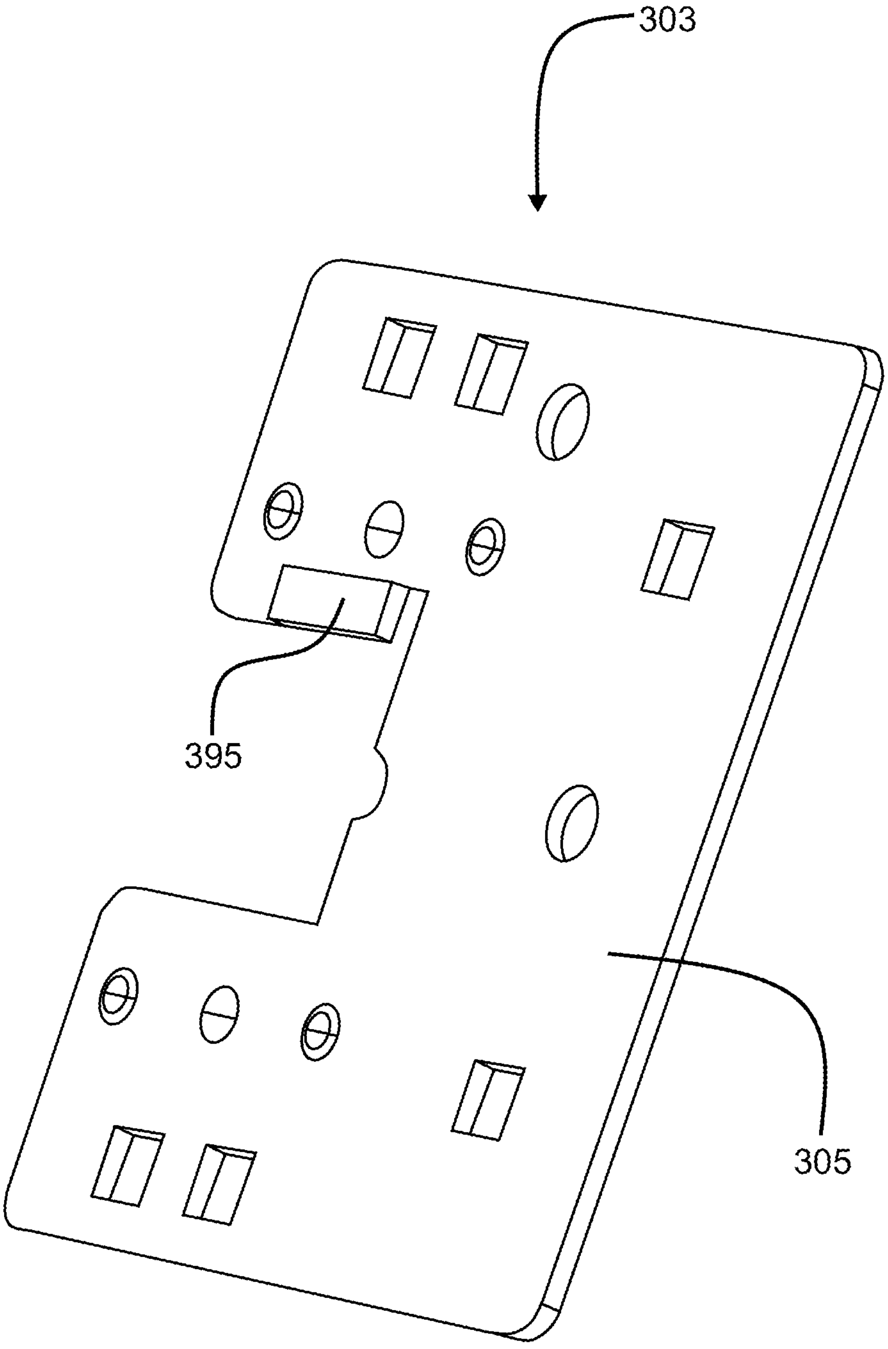
FIG. 17 is a further perspective view of the mounting adapter of the assembly of FIG. 14.
Figure 18:
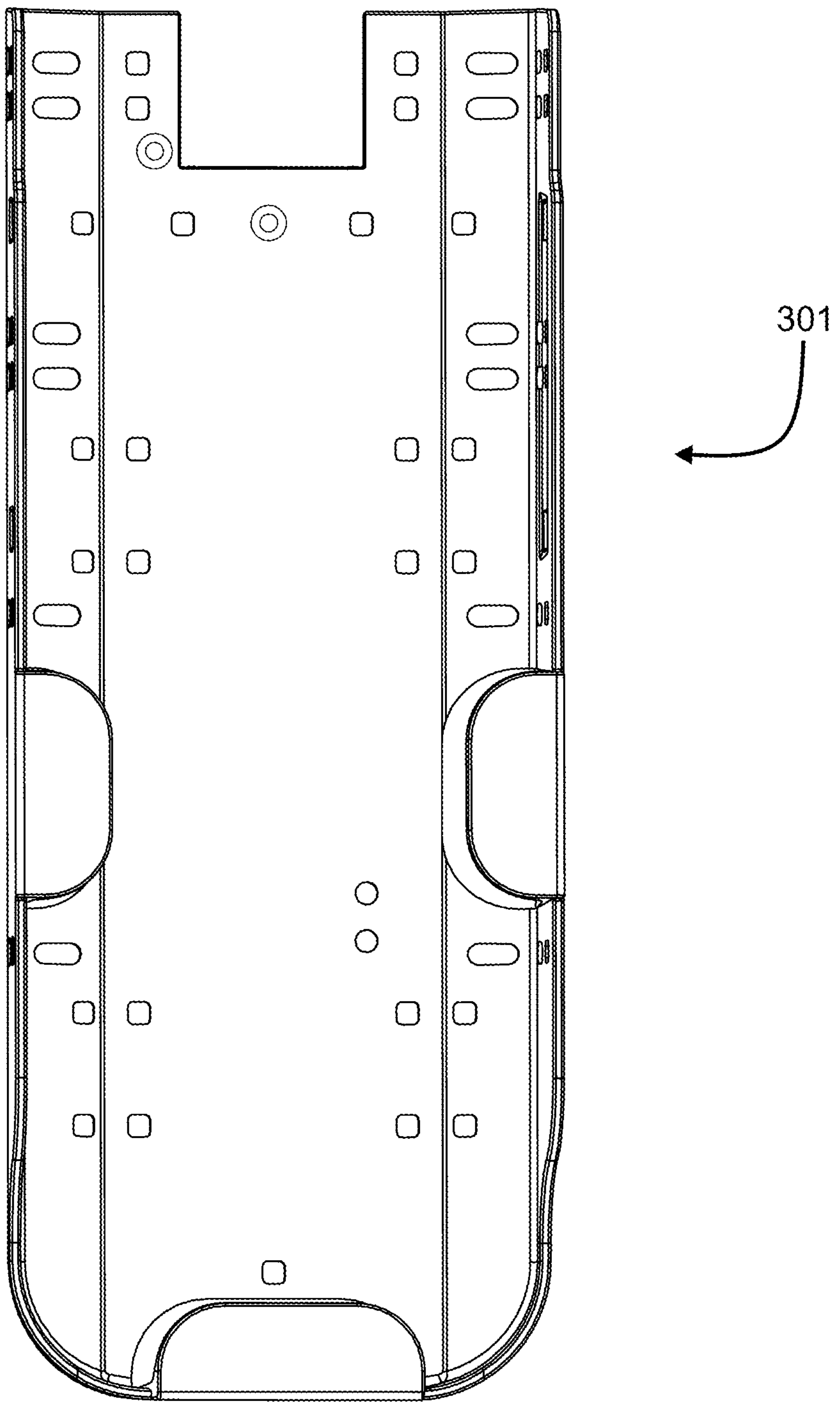
FIG. 18 is a perspective view of the basket of the assembly of FIG. 14.

To securely mount the basket 201 to the tower 122 (FIG. 13), the mounting portion 290 is received in the slot 181. The mounting portion 290 is inserted into the slot 181 until the latch arms 295 flex and then resiliently return (side-to-side) to an unflexed configuration in which the catches 296 catch under the shoulder 184 at the sides of the shoulder 184. The walls 291 can engage or nearly engage sides of the arm 182 to reinforce side-to-side stability of the basket 201 relative to the tower 122. When the basket 201 is fully installed to the tower 122, the keying feature 186 is received in the notch 298 and edges of the stabilizing tab 185 abut edges of the keying portion 297 for further side-to-side stability of the basket 201 relative to the tower 122.

Referring to FIGS. 14-18, a basket assembly 300 in accordance with the present disclosure that can be securely mounted to the support structure 120 of FIG. 3 will be described.

The assembly 300 includes a basket 301 and a mounting adapter 303. The mounting adapter 303 is secured (e.g., by staking, riveting, thermally adhering, or otherwise fastening the adapter 303 to the basket 301). The basket 301 is constructed entirely of plastic. In some examples, the mounting adapter 303 is constructed entirely of plastic. In other examples, the mounting adapter 303 is constructed of metal.

The basket 301 performs the same function as the baskets 101 and 201. The adapter 303 serves the same function as the mounting portions 190 and 290, to securely mount the basket 301 to the mounting portion 180 of the tower 122.

The adapter 303 includes plate 305 having a resilient latch arm 395. The plate 305 includes a keying portion 397, which defines a keying notch 398 that functions the same way as the keying notches 198 and 298.

To securely mount the basket 301 to the tower 122, the adapter 303 is received in the slot 181. The adapter 303 is inserted into the slot 181 until the latch arm 395 flexes and then resiliently returns to an unflexed configuration in which it catches on the arm 182. When the basket 301 is fully installed to the tower 122, the keying feature 186 is received in the notch 398 and edges of the stabilizing tab 185 abut edges of the keying portion 397 for further side-to-side stability of the basket 301 relative to the tower 122.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A fiber management assembly of a telecommunications closure, comprising:

a basket extending from a bottom to a top along a first axis, from a first side to a second side along a second axis, and from a front to a back along a third axis, the basket including:

a basket volume configured to store loops of optical fibers; and a basket mounting portion; and a tower including an arrangement of receivers for pivotally receiving fiber management trays, wherein the basket mounting portion is configured to mount the basket directly to the tower, the basket mounting portion including a pair of resilient latch arms having catches and a keying tab defining a keying notch.

2. The fiber management assembly of claim 1, wherein the keying tab and the keying notch are positioned between the pair of resilient latch arms.

3. A basket for a fiber management assembly of a telecommunications closure, the basket extending from a bottom to a top along a first axis, from a first side to a second side along a second axis, and from a front to a back along a third axis, the basket comprising:

a basket volume configured to store loops of optical fibers; and a basket mounting portion configured to mount the basket to a tower configured to pivotally support fiber management trays, the basket mounting portion including a pair of resilient latch arms having catches and a keying tab defining a keying notch, wherein the basket mounting portion includes ribs configured to frictionally engage the tower, the ribs being positioned at front and back sides of the basket mounting portion.

4. The basket of claim 3, wherein the ribs include ramps at bottom ends of the ribs.

5. The basket of claim 3, wherein the ribs are configured to engage the tower to inhibit movement parallel to the third axis of the basket relative to the tower.

6. A basket for a fiber management assembly of a telecommunications closure, the basket extending from a bottom to a top along a first axis, from a first side to a second side along a second axis, and from a front to a back along a third axis, the basket comprising:

a basket volume configured to store loops of optical fibers; and a basket mounting portion configured to mount the basket to a tower configured to pivotally support fiber management trays, the basket mounting portion including a pair of resilient latch arms having catches and a keying tab defining a keying notch, wherein the basket mounting portion includes a pair of opposing stabilizing tabs, wherein the pair of resilient latch arms are configured to engage the tower to inhibit upward movement of the basket relative to the tower; and wherein the pair of opposing stabilizing tabs are configured to engage the tower to inhibit movement parallel to the second axis of the basket relative to the tower.

7. The basket of claim 6, wherein the keying notch and the keying tab are configured to engage the tower to inhibit downward movement of the basket relative to the tower.

8. A basket for a fiber management assembly of a telecommunications closure, the basket extending from a bottom to a top along a first axis, from a first side to a second side along a second axis, and from a front to a back along a third axis, the basket comprising:

a basket volume configured to store loops of optical fibers; and a basket mounting portion configured to mount the basket to a tower configured to pivotally support fiber management trays, the basket mounting portion including a pair of resilient latch arms having catches and a keying tab defining a keying notch, wherein the basket mounting portion includes stabilizing walls configured to engage outer surfaces of an arm of the tower to inhibit movement parallel to the second axis of the basket relative to the tower.

9. The fiber management assembly of claim 1, wherein the basket is constructed entirely of plastic.

10. A fiber management assembly of a telecommunications closure, the assembly extending from a bottom to a top along a first axis, from a first side to a second side along a second axis, and from a front to a back along a third axis, the assembly comprising:

a tower including receivers and a tower mounting portion, the tower mounting portion including:
- a pair of arms;
- a slot defined between the arms;
- a shoulder defined by one of the arms;
- a stabilizing block having tapered sides positioned in the slot; and
- a stabilizing tab including a male keying feature positioned in the slot;

fiber management trays having pins positioned in the receivers, the pins being pivotal within the receivers; and a basket constructed entirely of plastic and mounted to the tower, the basket including:
- a basket volume configured to store loops of optical fibers; and
- a basket mounting portion at least a portion of which is positioned in the slot, the basket mounting portion including:
  - a pair of resilient latch arms having catches engaging the shoulder to inhibit upward movement of the basket relative to the tower; and
  - a keying tab defining a keying notch that receives the male keying feature, and wherein edges of the keying tab abut edges of the stabilizing tab to inhibit downward movement of the basket relative to the tower.

11. The assembly of claim 10, wherein the keying tab and the keying notch are positioned between the pair of resilient latch arms.

12. The assembly of claim 10, wherein the basket mounting portion includes ribs frictionally engaging inner surfaces of the arms of the tower, the ribs being positioned at front and back sides of the basket mounting portion;

wherein the ribs include ramps at bottom ends of the ribs;

wherein the ribs are elongate parallel to the first axis and are configured to engage the tower to inhibit movement parallel to the third axis of the basket relative to the tower;

wherein the basket mounting portion includes a pair of opposing stabilizing tabs engaging the tapered sides of the stabilizing block to inhibit movement parallel to the second axis of the basket relative to the tower; and wherein the basket mounting portion includes stabilizing walls engaging outer surfaces of one of the pair of arms of the tower to inhibit movement parallel to the second axis of the basket relative to the tower.

13. A fiber management system, comprising:

a tower including a tower mounting portion and receivers configured to pivotally support fiber management trays, the tower mounting portion including:
- a pair of arms;
- a slot defined between the arms;
- a shoulder defined by one of the arms;
- a stabilizing block having tapered sides positioned in the slot; and
- a stabilizing tab including a male keying feature positioned in the slot;

a metal basket defining a basket volume configured to store loops of optical fibers; and a plastic basket defining a basket volume configured to store loops of optical fibers, wherein each of the metal basket and the plastic basket includes a basket mounting portion configured to mount to the tower mounting portion.

14. The system of claim 13, further comprising fiber management trays having pins positioned in the receivers, the pins being pivotal within the receivers.

15. The system of claim 13, wherein the basket mounting portion of the metal basket and the basket mounting portion of the plastic basket are configured differently from each other.

16. A basket for a fiber management assembly of a telecommunications closure, the basket extending from a bottom to a top along a first axis, from a first side to a second side along a second axis, and from a front to a back along a third axis, the basket comprising:

a basket volume configured to store loops of optical fibers; and a basket mounting portion configured to mount the basket to a tower configured to pivotally support fiber management trays, the basket mounting portion including a pair of resilient latch arms having catches and a keying tab defining a keying notch, wherein the pair of resilient latch arms are configured to flex away from each other and towards each other to latch to the tower.

17. A basket for a fiber management assembly of a telecommunications closure, the basket extending from a bottom to a top along a first axis, from a first side to a second side along a second axis, and from a front to a back along a third axis, the basket comprising:

a basket volume configured to store loops of optical fibers; and a basket mounting portion configured to mount the basket to a tower configured to pivotally support fiber management trays, the basket mounting portion including a pair of resilient latch arms having catches and a keying tab defining a keying notch, wherein the pair of resilient latch arms are configured to flex parallel to each other to latch to the tower.

18. The basket of claim 3, further comprising the tower.

19. The basket of claim 6, further comprising the tower.

20. The basket of claim 8, further comprising the tower.

21. The basket of claim 16, further comprising the tower.

22. The basket of claim 17, further comprising the tower.

* * * * *